US009331582B2

(12) United States Patent
Goerke

(10) Patent No.: US 9,331,582 B2
(45) Date of Patent: May 3, 2016

(54) VOLT-SECOND INTEGRATION CABLE COMPENSATION CIRCUIT

(71) Applicant: Texas Instruments Incorporated, Dallas, TX (US)

(72) Inventor: Ulrich B. Goerke, Dover, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 432 days.

(21) Appl. No.: 14/015,349

(22) Filed: Aug. 30, 2013

(65) Prior Publication Data

US 2014/0177303 A1 Jun. 26, 2014

Related U.S. Application Data

(60) Provisional application No. 61/745,303, filed on Dec. 21, 2012.

(51) Int. Cl.
*H02M 7/217* (2006.01)
*H02M 3/335* (2006.01)
*H02M 1/00* (2006.01)

(52) U.S. Cl.
CPC .. *H02M 3/33507* (2013.01); *H02M 2001/0025* (2013.01); *H02M 2001/0048* (2013.01)

(58) Field of Classification Search
CPC ............. H02M 2001/0025; H02M 2001/0048; H02M 3/33507; H02M 7/217
See application file for complete search history.

(56) References Cited

U.S. PATENT DOCUMENTS

| 5,304,917 A * | 4/1994 | Somerville ........... H02J 7/0081 320/148 |
| 2008/0246447 A1* | 10/2008 | Djenguerian ..... H02M 3/33523 323/234 |
| 2009/0262561 A1* | 10/2009 | Mayell ................ H02M 3/3385 363/21.12 |
| 2013/0155724 A1* | 6/2013 | Baurle .................... H02M 1/42 363/15 |
| 2014/0146580 A1* | 5/2014 | Koo ................... H02M 3/33523 363/21.17 |
| 2014/0159678 A1* | 6/2014 | Park .......................... G05F 1/10 323/229 |

\* cited by examiner

*Primary Examiner* — Jessica Han
(74) *Attorney, Agent, or Firm* — William B. Kempler; Frank D. Cimino

(57) ABSTRACT

A power converter (such as a battery charger) includes a cable configured to deliver a source voltage and current to a load, where the cable is anticipated to drop some voltage as the load current increases. The power converter also includes a regulator having a feedback-adjusting transistor configured to gradually compensate for the dropped cable voltage as the load current increases. The transistor has a gate capacitance and a resistance forming an integrator configured to filter a volt-second product of an output waveshape of the converter to derive an average voltage correlated to the load current as the load current increases. The regulator is configured to increase a gate voltage of the transistor through a threshold region of the transistor and gradually turn the transistor on. The transistor is configured to apply an adjusting resistance coupled to a feedback sensing node of the regulator to increase the source voltage to compensate for the cable voltage drop and improve the load voltage regulation.

20 Claims, 14 Drawing Sheets

| SW CONVERTER INPUT POWER |
| NO-LOAD, BEFORE V-S INTEGRATION COMPENSATION |
|---|
| $P_{NL}$ = 162Vdc x 40.8uA = 6.6mW<br>$P_{NL}$ = 325Vdc X 27uA = 8.8mW |
| Vout @ 162Vdc = 5.150V @ 0A<br>Vout @ 325Vdc = 5.150V @ 0A |

FIG. 6A

| SW CONVERTER INPUT POWER |
| NO-LOAD, AFTER V-S INTEGRATION COMPENSATION |
|---|
| $P_{NL}$ = 162Vdc x 40.8uA = 6.6mW<br>$P_{NL}$ = 325Vdc X 27uA = 8.8mW |
| Vout @ 162Vdc = 5.150V @ 0A<br>Vout @ 325Vdc = 5.150V @ 0A |

FIG. 6B

| CONVERTER WITH LOAD @ 162Vdc ||||||
|---|---|---|---|---|---|
| BEFORE V-S INTEGRATION COMP ||| AFTER V-S INTEGRATION COMP |||
| mA | $V_{OUT}$ | dV @ 0.3ohm | mA | $V_{OUT}$ | dV @ 0.3ohm |
| 3.1 | 5.150 | 0.00093 | 3.1 | 5.150 | 0.00093 |
| 53.1 | 5.148 | 0.01593 | 53.1 | 5.147 | 0.01593 |
| 104.3 | 5.145 | 0.03129 | 104.3 | 5.144 | 0.03129 |
| 156.2 | 5.142 | 0.04686 | 156.2 | 5.142 | 0.04686 |
| 207.5 | 5.139 | 0.06225 | 207.5 | 5.140 | 0.06225 |
| 258.7 | 5.137 | 0.07761 | 258.7 | 5.138 | 0.07761 |
| 326.8 | 5.132 | 0.09804 | 326.8 | 5.135 | 0.09804 |
| 377.5 | 5.128 | 0.11325 | 378.1 | 5.137 | 0.11343 |
| 428.1 | 5.125 | 0.12843 | 430.0 | 5.144 | 0.12900 |
| 478.7 | 5.121 | 0.14361 | 481.8 | 5.154 | 0.14454 |
| 529.3 | 5.117 | 0.15879 | 535.6 | 5.175 | 0.16068 |
| 580.0 | 5.110 | 0.17400 | 590.6 | 5.207 | 0.17718 |
| 646.2 | 5.099 | 0.19386 | 647.5 | 5.247 | 0.19425 |
| 711.8 | 5.086 | 0.21354 | 708.7 | 5.313 | 0.21261 |
| 761.2 | 5.077 | 0.22836 | 760.6 | 5.306 | 0.22818 |
| 810.0 | 5.069 | 0.24300 | 811.8 | 5.298 | 0.24354 |
| 859.3 | 5.060 | 0.25779 | 862.5 | 5.288 | 0.25875 |
| 908.1 | 5.050 | 0.27243 | 913.7 | 5.279 | 0.27411 |
| 972.5 | 5.039 | 0.29175 | 964.3 | 5.270 | 0.28929 |
| 1020.6 | 5.030 | 0.30618 | 1015.0 | 5.260 | 0.30450 |
| 1116.2 | 5.012 | 0.33486 | 1114.3 | 5.240 | 0.33429 |
| 1210.6 | 4.993 | 0.36318 | 1214.3 | 5.222 | 0.36429 |
| 1226.8 | 4.862 | 0.36804 | 1225.6 | 4.852 | 0.36768 |
| 1223.7 | 4.496 | 0.36711 | 1223.1 | 4.493 | 0.36693 |
| 1224.3 | 4.196 | 0.36729 | 1223.7 | 4.193 | 0.36711 |

FIG. 7A

| CONVERTER WITH LOAD @ 325Vdc ||||||
|---|---|---|---|---|---|
| BEFORE V-S INTEGRATION COMP ||| AFTER V-S INTEGRATION COMP |||
| mA | $V_{OUT}$ | dV @ 0.3ohm | mA | $V_{OUT}$ | dV @ 0.3ohm |
| 3.1 | 5.148 | 0.00093 | 3.1 | 5.147 | 0.00093 |
| 53.1 | 5.146 | 0.01593 | 53.1 | 5.145 | 0.01593 |
| 104.3 | 5.143 | 0.03129 | 104.3 | 5.142 | 0.03129 |
| 156.2 | 5.141 | 0.04686 | 156.2 | 5.140 | 0.04686 |
| 207.5 | 5.138 | 0.06225 | 207.5 | 5.138 | 0.06225 |
| 258.7 | 5.135 | 0.07761 | 258.7 | 5.136 | 0.07761 |
| 326.8 | 5.131 | 0.09804 | 326.8 | 5.135 | 0.09804 |
| 377.5 | 5.128 | 0.11325 | 378.1 | 5.135 | 0.11343 |
| 428.1 | 5.125 | 0.12843 | 429.3 | 5.135 | 0.12879 |
| 478.7 | 5.122 | 0.14361 | 480.6 | 5.138 | 0.14418 |
| 530.0 | 5.118 | 0.15900 | 532.5 | 5.145 | 0.15975 |
| 580.6 | 5.115 | 0.17418 | 586.2 | 5.163 | 0.17586 |
| 647.5 | 5.109 | 0.19425 | 639.3 | 5.181 | 0.19179 |
| 698.1 | 5.105 | 0.20943 | 713.7 | 5.220 | 0.21411 |
| 764.3 | 5.096 | 0.22929 | 755.6 | 5.274 | 0.22668 |
| 813.1 | 5.089 | 0.24393 | 815.0 | 5.316 | 0.24450 |
| 862.5 | 5.080 | 0.25875 | 866.2 | 5.310 | 0.25986 |
| 911.2 | 5.072 | 0.27336 | 917.5 | 5.302 | 0.27525 |
| 960.0 | 5.064 | 0.28800 | 968.7 | 5.294 | 0.29061 |
| 1025.0 | 5.053 | 0.30750 | 1020.0 | 5.286 | 0.30600 |
| 1121.2 | 5.036 | 0.33636 | 1120.6 | 5.286 | 0.33618 |
| 1216.8 | 5.020 | 0.36504 | 1221.2 | 5.250 | 0.36636 |
| 1293.1 | 4.993 | 0.38793 | 1293.7 | 5.127 | 0.38811 |
| 1293.1 | 4.809 | 0.38793 | 1293.1 | 4.928 | 0.38793 |
| 1293.1 | 4.638 | 0.38793 | 1293.7 | 4.585 | 0.38811 |

FIG. 7B

| Vload @ 162V | | Vload @ 325V | |
| --- | --- | --- | --- |
| NO COMP | WITH COMP | NO COMP | WITH COMP |
| 5.149 | 5.149 | 5.147 | 5.146 |
| 5.132 | 5.131 | 5.130 | 5.129 |
| 5.114 | 5.113 | 5.112 | 5.111 |
| 5.095 | 5.095 | 5.094 | 5.093 |
| 5.077 | 5.078 | 5.076 | 5.076 |
| 5.059 | 5.060 | 5.057 | 5.058 |
| 5.034 | 5.037 | 5.033 | 5.037 |
| 5.015 | 5.024 | 5.015 | 5.022 |
| 4.997 | 5.015 | 4.997 | 5.006 |
| 4.977 | 5.009 | 4.978 | 4.994 |
| 4.958 | 5.014 | 4.959 | 4.985 |
| 4.936 | 5.030 | 4.941 | 4.987 |
| 4.905 | 5.053 | 4.915 | 4.989 |
| 4.872 | 5.100 | 4.896 | 5.006 |
| 4.849 | 5.078 | 4.867 | 5.047 |
| 4.826 | 5.054 | 4.845 | 5.072 |
| 4.802 | 5.029 | 4.821 | 5.050 |
| 4.778 | 5.005 | 4.799 | 5.027 |
| 4.747 | 4.981 | 4.776 | 5.003 |
| 4.724 | 4.956 | 4.746 | 4.980 |
| 4.677 | 4.906 | 4.700 | 4.950 |
| 4.630 | 4.858 | 4.655 | 4.884 |
| 4.494 | 4.484 | 4.605 | 4.739 |
| 4.129 | 4.126 | 4.421 | 4.540 |
| 3.829 | 3.826 | 4.250 | 4.197 |

FIG. 8

VOLT-SECOND INTEGRATION CABLE COMPENSATION CIRCUIT

CLAIM OF PRIORITY

This application claims priority of U.S. Patent Application Ser. No. 61/745,303 filed Dec. 21, 2012 entitled Volt-second Integration Cable Compensation Circuit, the teachings of which are incorporated herein by reference.

TECHNICAL FIELD

This disclosure is generally directed to battery chargers and AC-line adapters that have a cable between a voltage source and a load, such as chargers for portable electronic devices including, but not limited to mobile telephones and smartphones.

BACKGROUND

Flyback-derived chargers and similar adapters (generically termed "converters" hereafter) often have a cable between a voltage source and a load. This cable drops some voltage as the load current increases, unless there is compensation by a source controller integrated circuit (IC). Primary-side controllers using optically-coupled feedback from the secondary side of a regulator cannot incorporate cable compensation, so this function is usually accomplished external to the regulator. Opto-coupled feedback is commonly known as galvanic isolation and prevents a continuous electrically conductive path between output and input. Although the optical feedback path is used to regulate the voltage delivered to the regulator output, detecting a voltage drop across the cable due to its wire resistance cannot be accomplished using common feedback loop mechanisms. Moreover, a primary-side controller is generally incapable of over-riding the reference voltage of the secondary-side regulator without some elaborate additional circuitry with its own isolation.

Controllers located on the primary side often employ Primary-Side Regulation (PSR) techniques for adjusting the converter's regulation reference based on primary-side current information indicative of the load current. However, PSR is subject to transient response limitations that may be inadequate for certain application performance requirements. Instead, a low-cost secondary-side shunt regulator is used to generate an error signal which is optically coupled to the primary-side controller which controls the power conversion based on the feedback signal level.

SUMMARY

Embodiments of this disclosure include a cable compensation circuit. A converter has a regulator configured to compensate for a voltage drop across a cable as load current increases to increase and regulate a load voltage. The regulator has a feedback-adjusting transistor configured to gradually compensate for the cable's voltage drop as the load current increases. The transistor has a parasitic capacitance and a gate resistance forming an integrator configured to filter a volt-second product of a flyback output waveshape to derive an average voltage correlated to the load current as the load current increases. The gate voltage of the transistor is configured to increase through a threshold region of the transistor and gradually turn the transistor on, and the transistor is configured to adjust a resistance coupled to a feedback sensing node of the regulator to increase the source voltage so as to compensate for the cable voltage drop as the load current increases.

BRIEF DESCRIPTION OF THE DRAWINGS

For a more complete understanding of this disclosure and its features, reference is now made to the following description, taken in conjunction with the accompanying drawings, in which:

FIG. 6A and FIG. 6B are charts of parameters of a 5 W converter board without load before active cable compensation;

FIG. 7A and FIG. 7B are charts of parameters of a 5 W converter board output voltage with load after V-s integration cable compensation;

FIG. 8 is a chart of parameters of a 5 W load board input voltage with a load before and after active cable compensation;

DETAILED DESCRIPTION

FIGS. 1 through 14, discussed below, and the various embodiments used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
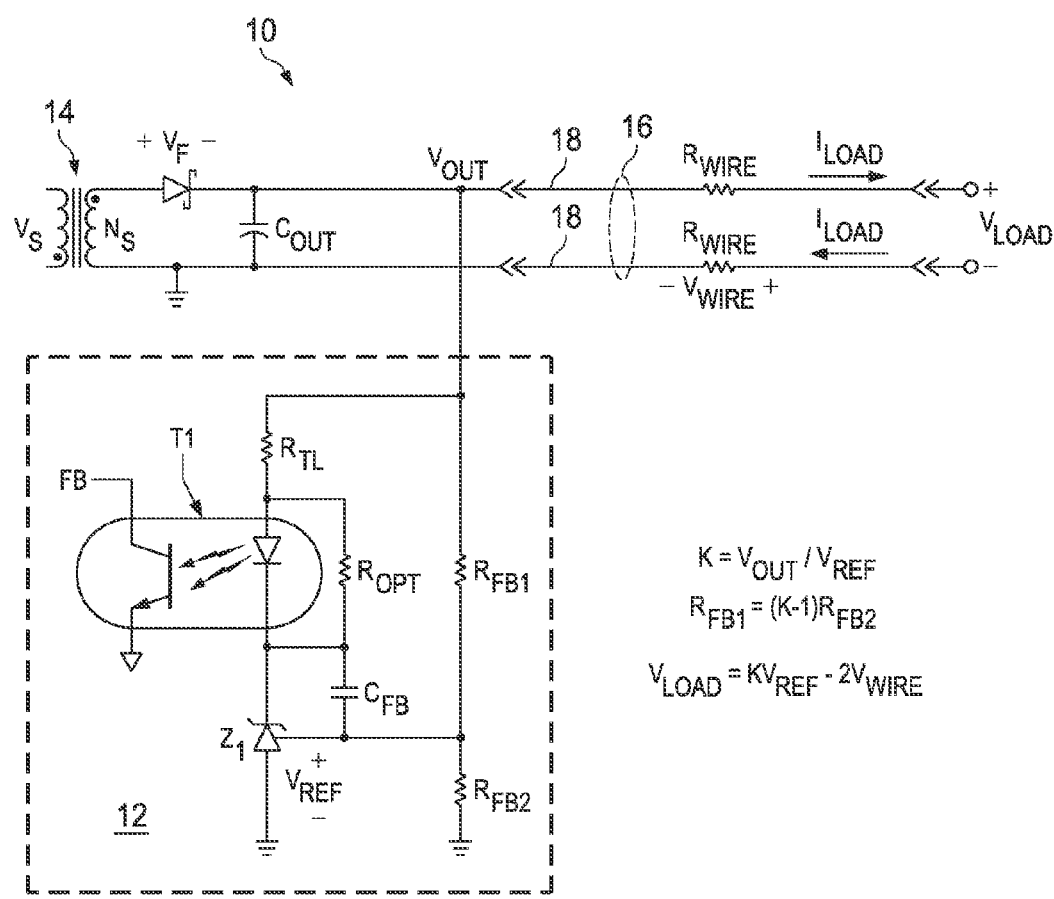
FIG. 1 is a partial schematic of a converter with an opto-coupled flyback regulator and no cable compensation.

FIG. 1 is a partial schematic of a flyback converter 10 with an opto-coupled shunt-regulator circuit 12 and no cable compensation circuit. Without cable compensation, the load voltage $V_{load}$ falls directly as the load current $I_{load}$ increases through the cable resistance $R_{wire}$. While this circuit may be suitable for low current designs, it is insufficient for higher-current applications as $V_{load}$ drops to unacceptable voltages.

Flyback converter 10 is seen to include an input transformer 14, which receives a pulsing source voltage Vs and couples a transformed, rectified, and filtered voltage $V_{out}$ to a cable 16. The wire resistance of the cable 16 is denoted as $R_{wire}$ on each cable wire 18, and the associated voltage drop for each wire is denoted as $V_{wire}$. The delivered load voltage at the termination of the cable 16 is $V_{load}$, which is $V_{out} - 2V_{wire}$. Wires 18 provide a continuous electrical path, where one is denoted the positive (+) wire and the other is denoted the negative wire (−).

The shunt-regulator circuit 12 provides an opto-coupled feedback error signal FB based on $V_{out}$ at the proximal end of the cable 16. The optical coupler T1 provides galvanic isolation for the feedback signal FB. The shunt-regulator circuit 12 does not account for the resistance $R_{wire}$ of each of the cable wires 18, even though those resistances $R_{wire}$ create the voltage drop $V_{wire}$ proportional to the load current $I_{load}$. The shunt-regulator circuit 12 taps a feedback signal from $V_{out}$ controlled by resistive divide network resistors $R_{fb1}$ and $R_{fb2}$ with gain k, where the feedback signal is compared to an internal reference voltage $V_{ref}$ established by shunt-regulator $Z_1$. Shunt-regulator $Z_1$ generates a current proportional to the voltage difference between $kV_{out}$ and $V_{ref}$ to create the feedback error signal FB, which modulates the power stage (not shown) duty-cycle to regulate the output voltage $V_{out}$. Since there is no cable compensation, the load voltage $V_{load}$ falls directly as the load current $I_{load}$ increases. The regulator 12 also includes trimming components $R_{ti}$, $R_{opt}$, and $C_{fb}$.

Figure 2:
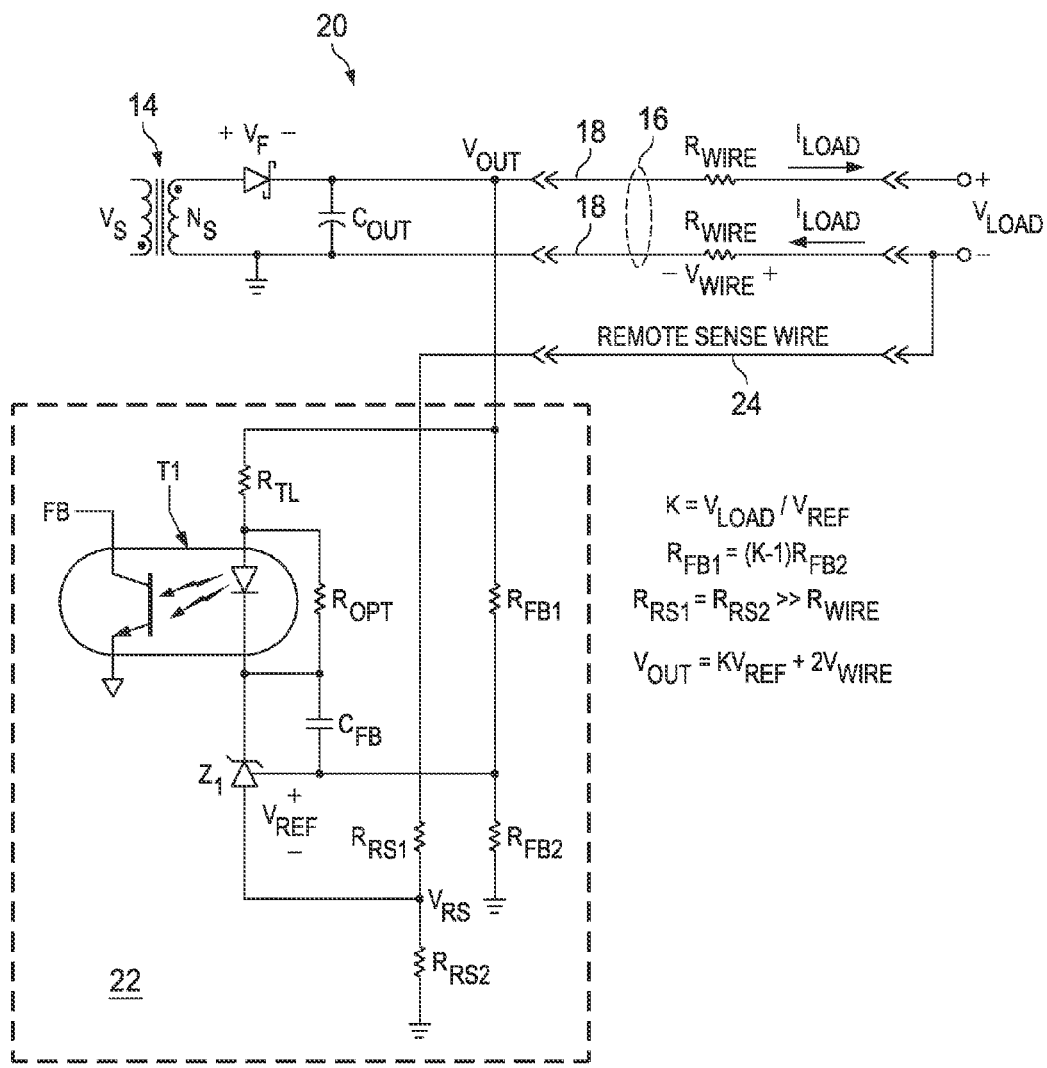
FIG. 2 is a partial schematic of a converter with an opto-coupled flyback regulator and remote-sense cable compensation.

FIG. 2 is a partial schematic of a flyback converter 20 with an opto-coupled shunt-regulator circuit 22 which includes a remote-sense cable compensation network. Like reference numerals refer to like elements including those described with reference to FIG. 1. The shunt-regulator 22 is responsive to both $V_{out}$ at the proximal end of the cable 16 and also to a remote sense voltage $V_{rs}$ derived from the load voltage $V_{load}$ of the cable 16 via wire 24. The voltage $V_{rs}$ is established by a pair of remote sense resistors $R_{rs1}$ and $R_{rs2}$ which form a resistive divide network with gain k between the negative terminal of $V_{load}$ and proximal ground. Advantageously, the transistor $T_1$ responds to a voltage relationship between $V_{out}$ and $V_{rs}$ to create the opto-coupled feedback signal FB, where the voltage reference $V_{rs}$ is a function of the cable resistance. Remote sense wire 24 carries insignificant current and so its voltage drop is negligible. This allows the converter 20 to compensate for resistance of the cable wires 18 and their resulting voltage drops. Advantageously, the compensation automatically adjusts with cable length since it accounts for the varying voltage drop from the varying resistance of the cable wires 18.

Figure 3:
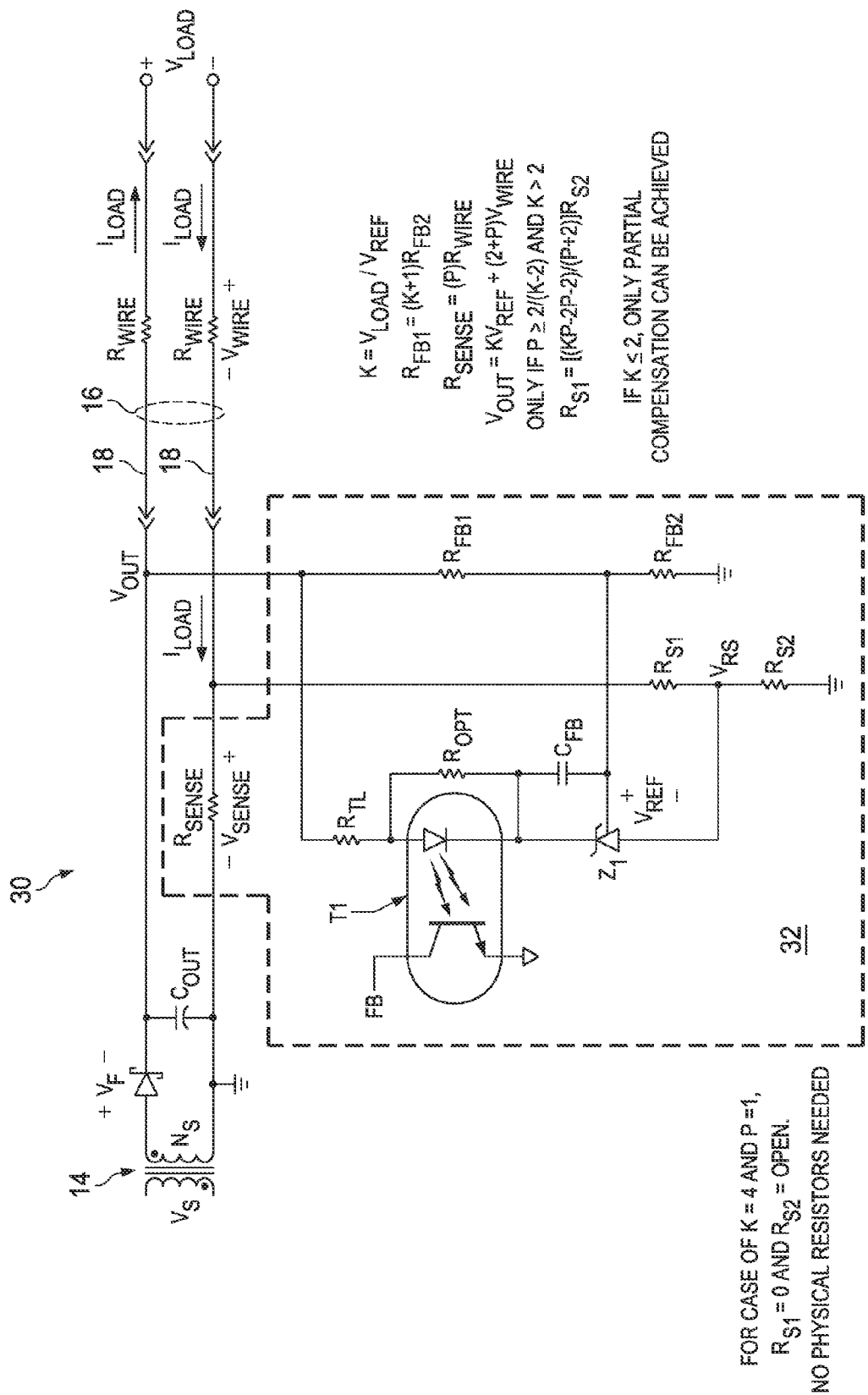
FIG. 3 is a partial schematic of a converter with an opto-coupled flyback regulator and local sense cable compensation.

FIG. 3 is a partial schematic of a flyback converter 30 with an opto-coupled shunt-regulator 32 which includes a local sense cable compensation network. In particular, the converter 30 implements linear cable compensation with an additional local sense resistance $R_{sense}$. In some embodiments, the local sense resistance $R_{sense}$ is designed as a narrow section of printed circuit board (PCB) copper with a resistance proportional to the cable wire resistance $R_{wire}$. This converter 30 is simpler than the remote sensing converter 20, although it may be less accurate, does not adjust with cable length, and incurs additional loss.

Figure 4:
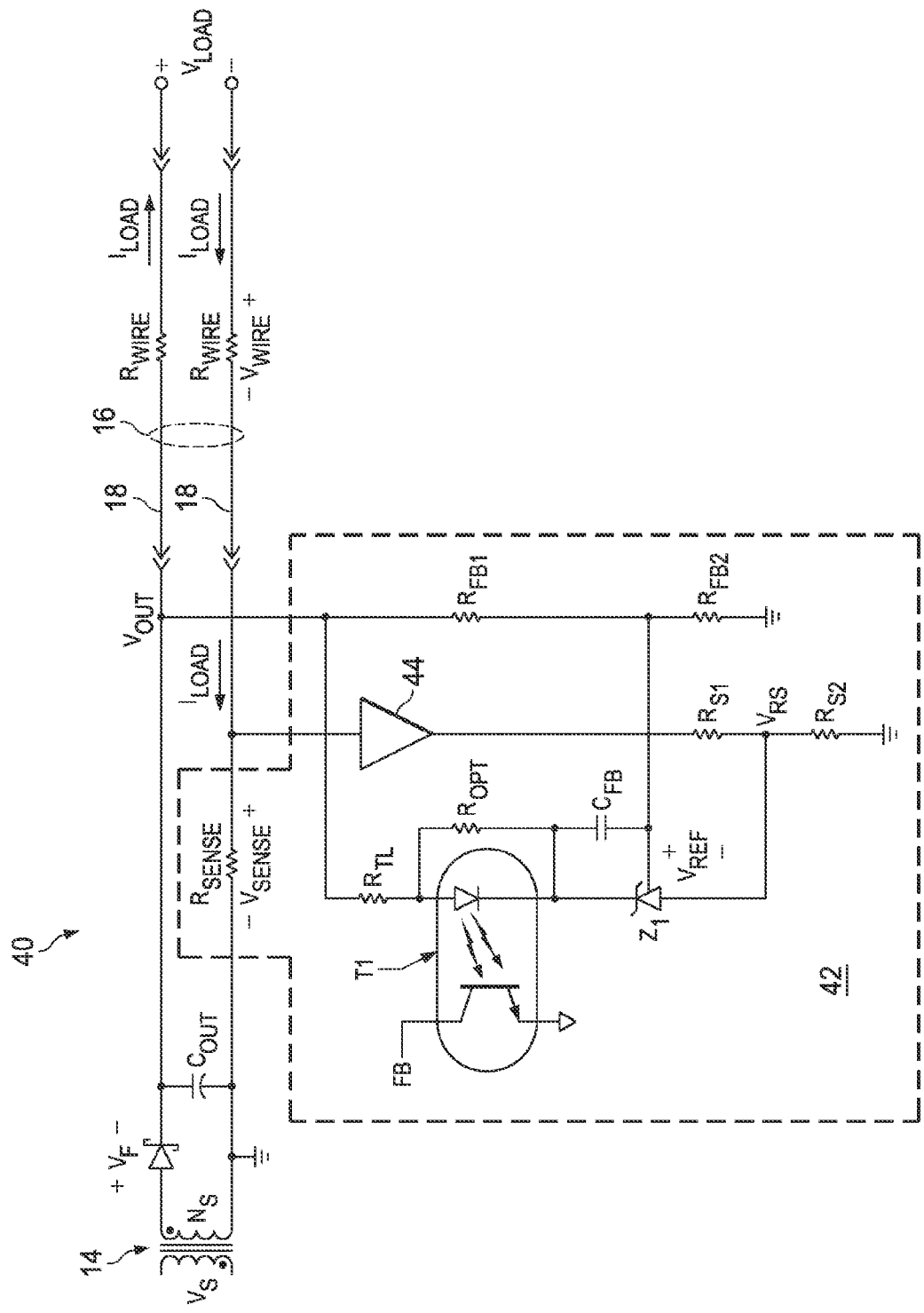
FIG. 4 is a partial schematic of a converter with an opto-coupled flyback regulator and amplified-sense cable compensation.

FIG. 4 is a partial schematic of a flyback converter 40 with an opto-coupled shunt-regulator 42 which includes an amplified-sense cable compensation network. In particular, the converter 40 implements linear cable compensation with an additional local sense resistance $R_{sense}$ and an amplifier 44. This approach uses a lower-valued local sense resistor $R_{sense}$ to reduce loss, and the amplifier 44 is used to amplify a $V_{sense}$ signal. In this approach, the compensation incurs higher complexity, does not adjust with cable length, and no-load losses can increase.

Figure 5:
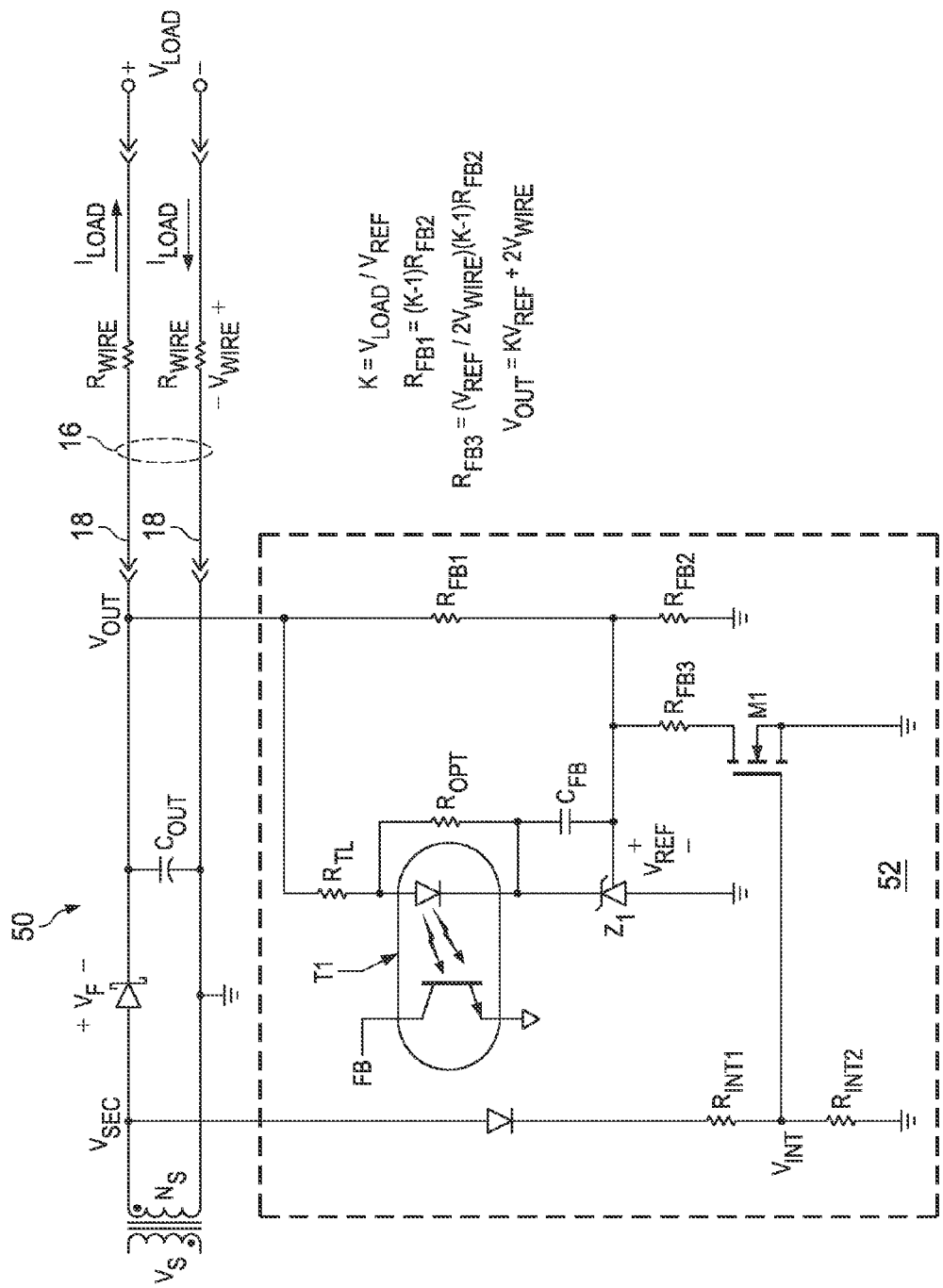
FIG. 5 is a partial schematic of a converter with an opto-coupled flyback regulator and V-s integration cable compensation.

FIG. 5 is a partial schematic of a flyback converter 50 with an opto-coupled shunt-regulator 52 which includes V-s integration cable compensation. In particular, the converter 50 uses non-linear cable compensation with volt-second (V-s) integration supported by a transistor $M_1$ (such as a MOSFET transistor). The transistor $M_1$ has a parasitic gate capacitance $C_{iss}$ and resistors $R_{INT1}$ and $R_{INT2}$, which form an integrator that filters the volt-second product of the flyback output waveshape to derive an average voltage $V_{INT}$ roughly proportional to the output current $I_{load}$. As the V-s product of $V_{SEC}$ increases, the gate voltage $V_{INT}$ increases through the threshold region of the transistor $M_1$ and gradually turns the transistor $M_1$ on, such that the transistor $M_1$ responsively applies an adjusting resistance including $R_{FB3}$ to the feedback sensing network of the regulator 52. This responsively increases the voltage $V_{out}$ by a desired amount. The regulator 52 taps a voltage $V_{sec}$ from the secondary side of the transformer 14 prior to rectification and feeds it to a resistive divide network formed by resistors $R_{int1}$ and $R_{int2}$. The node between this resistive divide network is coupled to the gate of the transistor $M_1$. The values of $R_{int1}$ and $R_{int2}$ can be chosen empirically to form an integrator with $C_{iss}$ of the transistor $M_1$, which integrates the average value of $V_{sec}$ and turns on the transistor $M_1$ gradually.

FIG. 6A and FIG. 6B are charts of parameters of a 5 W source converter without load before implementing active cable compensation. Referring to FIG. 6A, there is depicted a chart showing test data using a 5 W ($5V_{out}$@1 A capability) source converter board with no load using the converter 10 having the regulator 12 without cable compensation as shown in FIG. 1. FIG. 6B shows test data with no load using the converter 50 having the regulator 52 including cable compensation as shown in FIG. 5. As can be seen here, the cable compensation network of regulator 52 of FIG. 5 could essentially make no difference in no-load operating performance.

FIG. 7A and FIG. 7B are charts of parameters of a 5 W source board with load before and after V-s integration cable compensation is implemented. Referring to FIG. 7A and FIG. 7B, there are depicted charts showing source voltage test data using the same test board having a load, comparing circuit parameters using the regulator 12 without cable compensation as shown in FIG. 1 and using the regulator 52 including cable compensation as shown in FIG. 5. These charts illustrate the advantageous compensation for the cable wire resistance as the load current $V_{load}$ increases.

FIG. 8 is a chart of parameters of a 5 W test board with a load before and after active V-s cable compensation. The 5 W test board is coupled to the 5 W source converter board by a cable with total resistance of approximately 0.3 ohms. In particular, the chart illustrates the load voltage $V_{load}$ at currents corresponding to those of FIGS. 7A and 7B with and without V-s cable compensation for a couple of operating parameters. FIG. 8 illustrates the effective cable wire compensation achieved using the compensation regulator 52.

Figure 9:
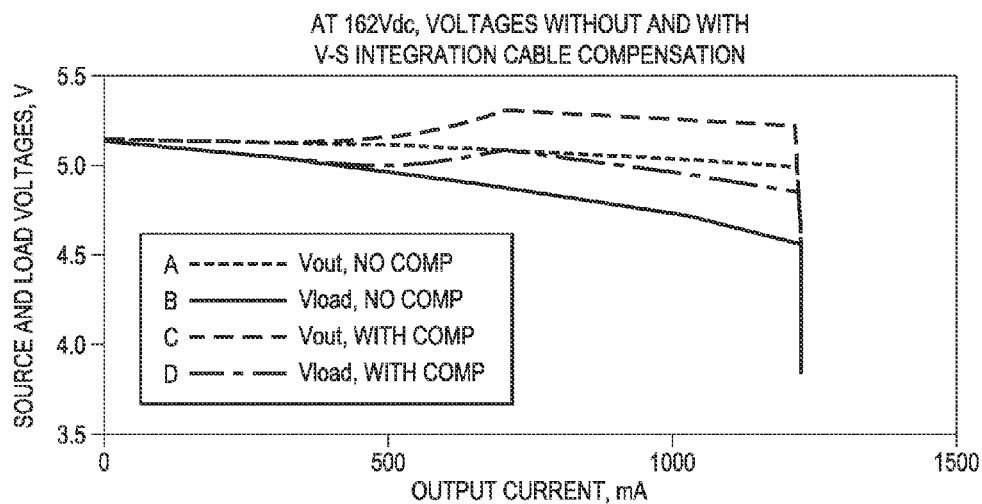
FIGS. 9 and 10 are waveform diagrams depicting voltages at $V_{out}$ and $V_{load}$.
Figure 10:
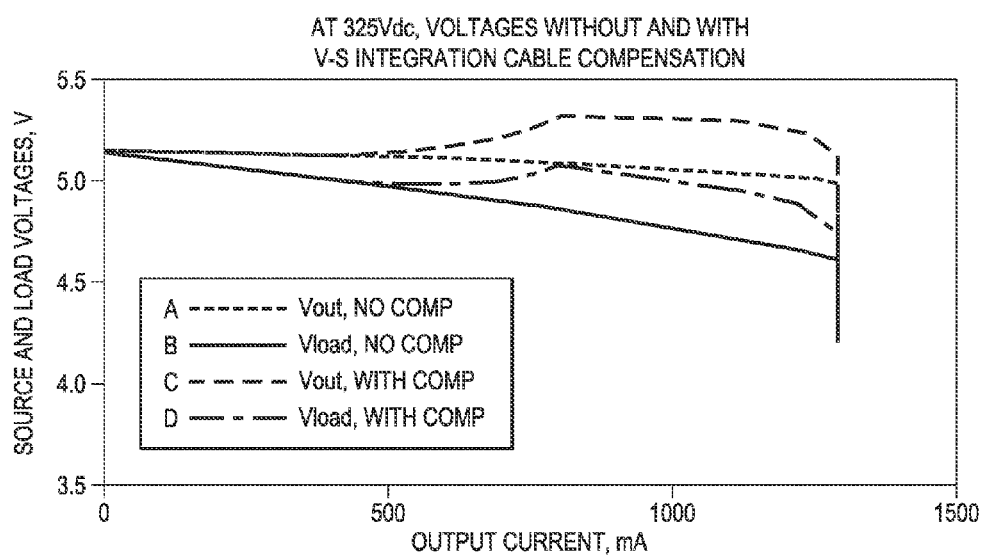

FIGS. 9 and 10 are diagrams depicting voltages at $V_{out}$ and $V_{load}$ from FIGS. 7A, 7B and 8 plotted with respect to load current for two different input parameters. In particular, FIGS. 9 and 10 illustrate graphs depicting $V_{out}$ and $V_{load}$ of the converter 10 without cable compensation and $V_{out}$ and $V_{load}$ of the converter 50 with the V-s cable compensation regulator 52. For the converter 10 including the regulator 12 without cable compensation, the voltages $V_{out}$ and $V_{load}$ are shown to linearly decrease as the load current $I_{load}$ increases, where lines A reflect $V_{out}$ and lines B reflect $V_{load}$ without cable compensation. Although $V_{out}$ declines slightly due to some source impedance, $V_{load}$ is seen to decline significantly due to the cable resistance. For the converter 50 with the V-s cable compensation regulator 52, lines C show $V_{out}$ including the voltage compensation increase as the transistor $M_1$ turns on for currents over 0.5 A. Similarly, lines D show $V_{load}$ including the voltage compensation increase based on $V_{out}$. Lines D show that $V_{load}$ more closely follows the original source voltage $V_{out}$ lines A even when the load current increases.

FIGS. 11-14 are waveform diagrams depicting $V_{out}$ in response to a load-step with no compensation, in response to an unload-step with no compensation, in response to a load-step with compensation, and in response to an unload-step with compensatlvley, respectivley. In particular, there is shown the load-step on the 5 W board without and with active cable compensation using the V-s integration technique detailed with respect to the converter 50 having the regulator 52 as shown in FIG. 5. In all cases, the top waveform depicts V out ac-coupled at 100 mV per division to show the transient response details, and the bottom waveform depicts $V_{load}$ at 5 V per division at the input to an electronic load through a cable with 0.3-ohm total resistance.

Figure 11:
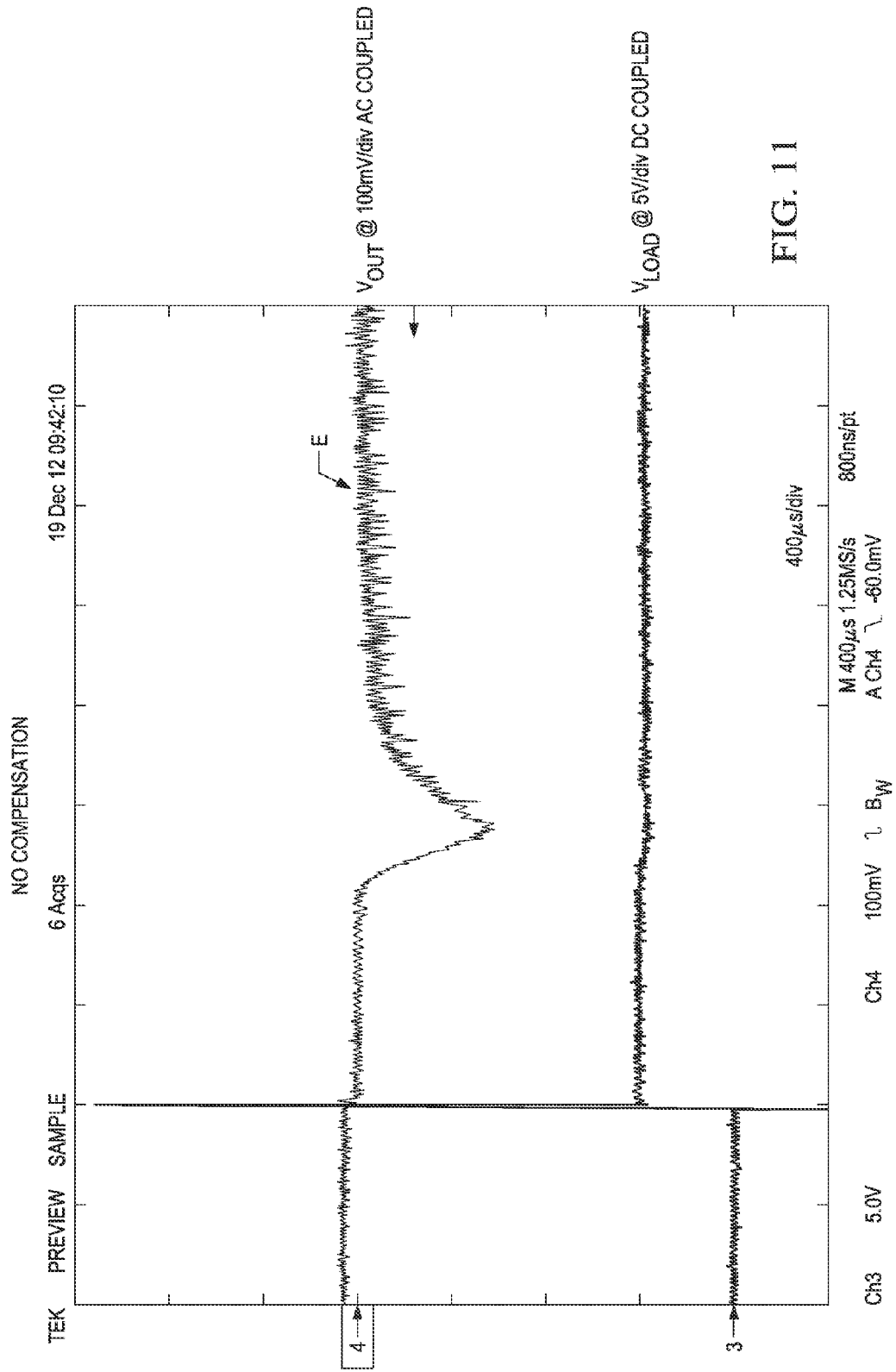
FIG. 11 is a waveform diagram depicting $V_{out}$ and $V_{load}$ in response to a load-step with no compensation.
Figure 12:
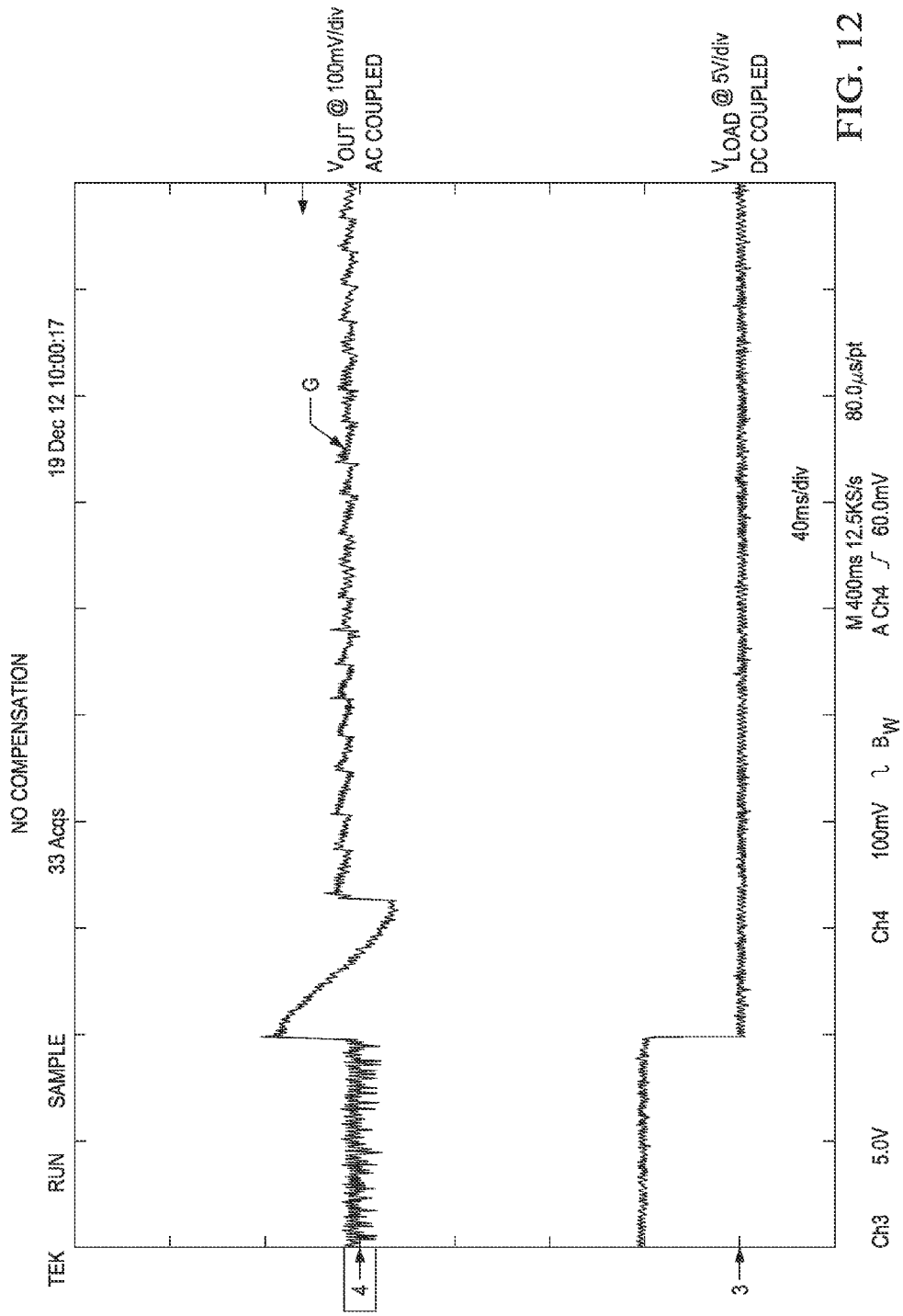
FIG. 12 is a waveform diagram depicting $V_{out}$ and $V_{load}$ in response to an unload-step with no compensation.
Figure 13:
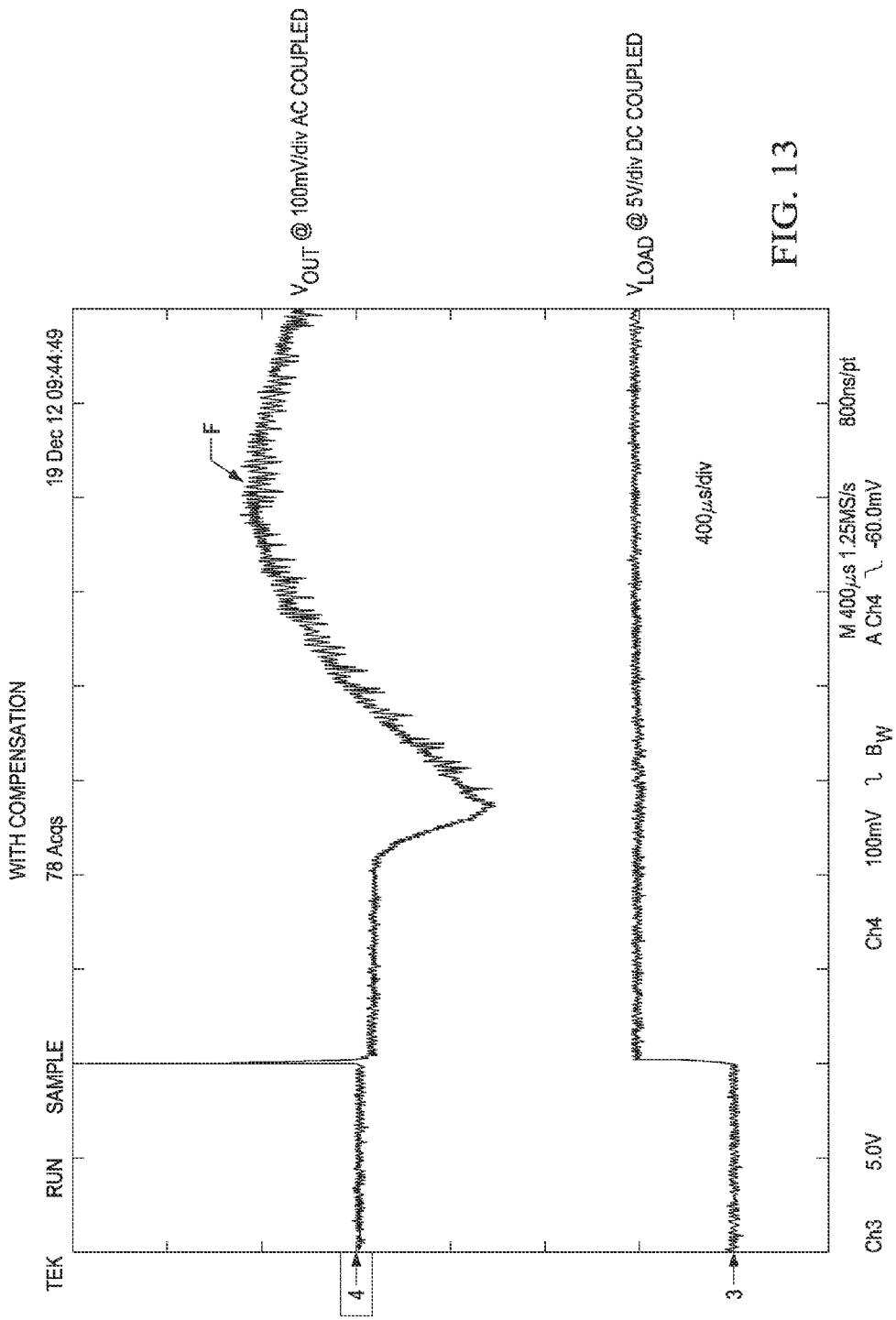
FIG. 13 is a waveform diagram depicting $V_{out}$ and $V_{load}$ in response to a load-step with V-s integration compensation.
Figure 14:
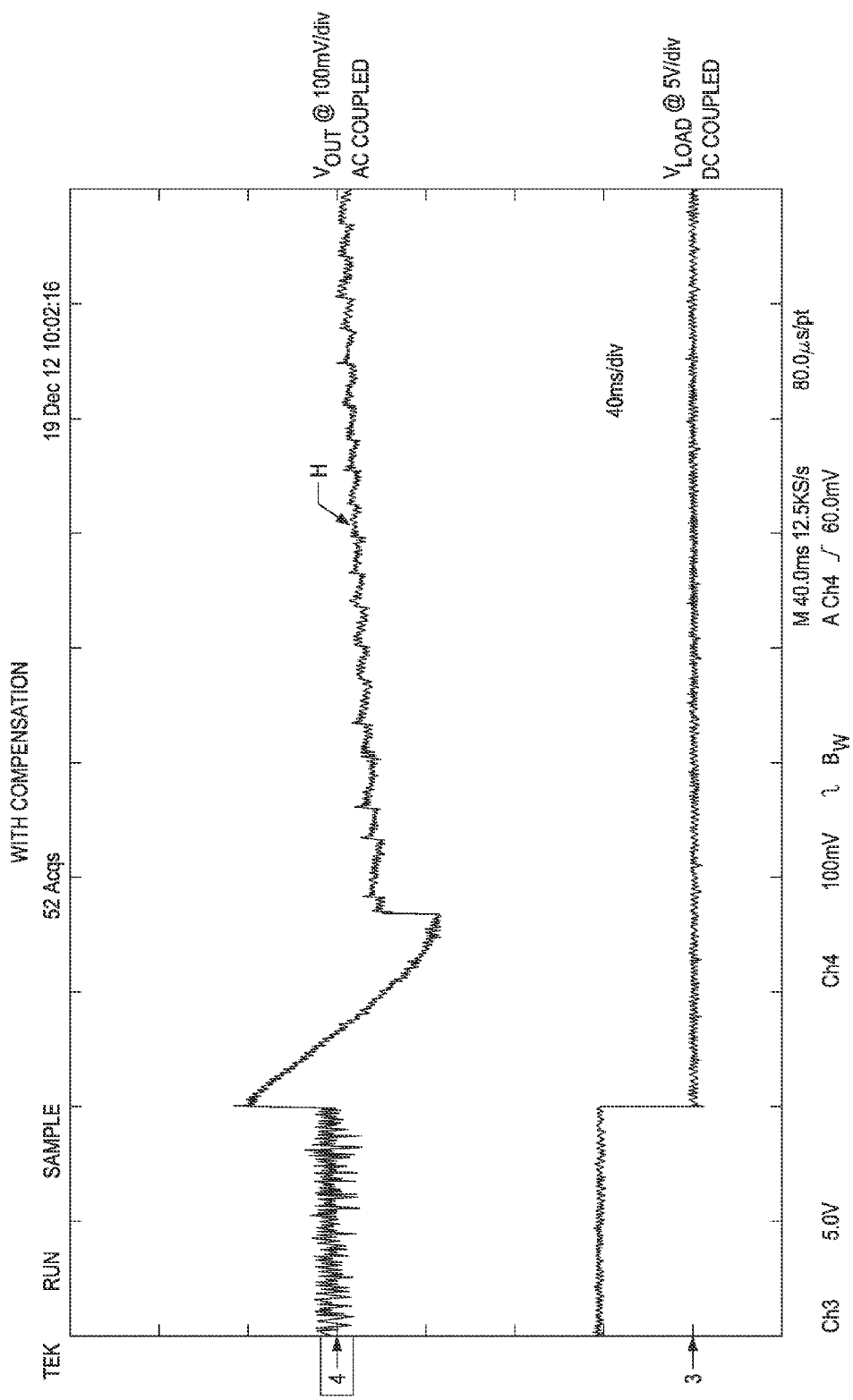
FIG. 14 is a waveform diagram depicting $V_{out}$ and $V_{load}$ in response to an unload-step with V-s integration compensation.

FIG. 11 shows ac-coupled $V_{out}$ at 100 mV/div as signal E without compensation due to a positive 1-A load step. FIG. 13 shows $V_{out}$ as signal F with compensation due to the same positive 1-A load step. FIG. 12 shows $V_{out}$ as signal G without compensation due to a negative 1-A load step, and FIG. 14 shows $V_{out}$ as signal H with compensation due to the same negative 1-A load step. The delay shown is an electronic load response time after connection to the source is made, and it is noted that active cable compensation does affect transient response. DC levels of $V_{out}$ are not shown due to the ac-coupling of the signal.

Although the above description has described specific embodiments of active cable compensation using V-s integration, various changes may be made to the active cable compensation mechanism. For example, the active cable compensation mechanism is not limited to use with the circuit of FIG. 5. Also, the operational characteristics shown in FIGS. 6A through 14 are examples only and do not limit the active cable compensation mechanism to any particular set of operational characteristics.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication of information. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. For use in a converter configured to provide a source voltage to a cable extending between the source voltage and a load where the cable drops a cable voltage as a load current to the load increases, a method comprising:
   providing an output waveshape to a regulator having a feedback adjusting transistor configured to gradually compensate for the dropped cable voltage as the load current increases; and
   using a gate capacitance of the transistor and a resistance as an integrator to filter a volt-second product of an output waveshape of the converter to derive an average voltage correlated to the load current as the load current increases;
   wherein the transistor is a signal-level MOSFET and a gate voltage of the transistor increases through a threshold region of the transistor and gradually turns the transistor on, the transistor applying an adjusting resistance coupled to a feedback sensing node of the regulator to increase the source voltage.

2. The method as specified in claim 1, wherein the converter comprises an input transformer receiving an input voltage and delivering a rectified secondary output voltage and a rectified secondary tap voltage, the rectified secondary tap voltage used to create the gate voltage coupled to a gate of the transistor.

3. The method as specified in claim 2, wherein the gate voltage is created by a resistive divide network coupled to the rectified secondary tap voltage.

4. The method as specified in claim 2, wherein the regulator is coupled between the rectified secondary output voltage and ground and provides a feedback adjustment path to the transistor.

5. The method as specified in claim 4, wherein the transistor has a drain voltage coupled to the feedback sensing node of the regulator.

6. The method as specified in claim 4, wherein a feedback sensing voltage is created at least in part by a resistive divide network coupled to the rectified secondary output voltage.

7. The method as specified in claim 4, wherein a feedback adjusting resistor is coupled between the feedback sensing voltage and the transistor.

8. A converter configured to deliver a source voltage and current to a load via a cable, wherein the cable is anticipated to drop a cable voltage as the load current increases, comprising:
   a regulator having a feedback adjusting transistor configured to gradually compensate for the dropped cable voltage as the load current increases, the transistor having a gate capacitance and external resistance forming an integrator configured to filter a volt-second product of an output waveshape of the converter to derive an average gate voltage correlated to the load current as the load current increases;
   wherein the regulator is configured to increase a gate voltage of the transistor through a threshold region of the transistor and gradually turn the transistor on, the transistor configured to apply an adjusting resistance coupled to a feedback sensing node of the regulator to increase the load voltage.

9. The converter as specified in claim 8, wherein:
   the converter further comprises an input transformer configured to receive an input voltage and deliver a rectified secondary output voltage and a rectified secondary tap voltage; and
   the rectified secondary tap voltage is configured to be used, in part, to create the gate voltage of the transistor.

10. The converter as specified in claim 9, further comprising a rectifier and resistive divide network coupled to the secondary output voltage and configured to create the gate voltage.

11. The converter as specified in claim 9, wherein the regulator is coupled between the rectified secondary output voltage and ground and is configured to provide a feedback sensing adjustment path to the transistor.

12. The converter as specified in claim 11, wherein the transistor has a drain voltage coupled to the feedback sensing node of the regulator.

13. The converter as specified in claim 11, wherein a feedback sensing voltage is created at least in part by a resistive divide network coupled to the rectified secondary output voltage.

14. The converter as specified in claim 13, wherein a feedback adjusting resistor is coupled between the feedback sensing voltage and the transistor.

15. The converter as specified in claim 8, wherein the regulator includes an optical coupler configured to provide a feedback error signal to regulate a converter output voltage.

16. A regulator configured to regulate a source voltage as a load current is delivered to a load using a cable, comprising:
 a feedback adjusting transistor configured to gradually compensate for dropped cable voltage as the load current increases, the transistor having a gate capacitance and a gate external resistance forming an integrator configured to filter a volt-second product of an output waveshape of the regulator to derive an average voltage correlated to the load current as the load current increases;
 wherein the transistor is a signal-level MOSFET and the regulator is configured to increase a gate voltage of the transistor through a threshold region of the transistor and gradually turn the transistor on, the transistor configured to apply an adjusting resistance coupled to a feedback sensing node of the regulator to increase the source voltage.

17. The regulator as specified in claim 16, further comprising a rectifier and a resistive divide network configured to create the gate voltage, wherein the integrator is configured to filter a volt-second product of an output waveshape of the rectifier.

18. The regulator as specified in claim 16, wherein an external capacitance is connected between the transistor gate and GND, to provide additional volt-second integration filtering.

19. The regulator as specified in claim 16, wherein the regulator is configured to provide a feedback sensing adjustment path to the transistor.

20. The regulator as specified in claim 19, further comprising a feedback adjusting resistance coupling a drain of the transistor to the feedback sensing node of the regulator.

* * * * *